May 3, 1960   M. RAULINE   2,934,987
LOOP CONTROL FLUID OPERATED MEANS FOR REGULATING THE
SPEED OF A CUTTING MEANS TO CUT UNIFORM LENGTHS
Filed Nov. 9, 1954

INVENTOR.
MAURICE RAULINE
BY
Mead, Browne, Schuyler & Beveridge
ATTORNEYS

United States Patent Office 2,934,987
Patented May 3, 1960

2,934,987

LOOP CONTROL FLUID OPERATED MEANS FOR REGULATING THE SPEED OF A CUTTING MEANS TO CUT UNIFORM LENGTHS

Maurice Rauline, Monts, France, assignor to The French State, represented by the Minister of National Defense (Gunpowder Department), Paris, France Application November 9, 1954, Serial No. 467,860

Claims priority, application France November 12, 1953

2 Claims. (Cl. 83—360)

My invention has for its object means for the automatic control of the operation of a cutting or the like machine by the output of another machine. It is applicable more particularly but not exclusively to the automatic adjustment of the speed of operation of a machine cutting continuous lengths of yielding material in cord, sheet, sausage and the like formation such as gunpowder cords as a function of the speed of extrusion of the latter. It has for its object an adjustment of the speed of the cutting machine as a function of the output of the extruding machine in a manner such as will adjust the amount of material travelling between the extruding machine and the cutting machine to a constant value so that even when the former machine slows down or increases its production for any reason whatever, as a consequence for instance of a modification in the homogeneity of the material it contains, the elements of material cut by the cutting machine retain lengths which are substantially constant whatever may be the modification in the output of the extruding machine.

To this end, and in conformity with the present invention, the speed of the motor driving the cutting machine is controlled by the location of a movable member such as a rocking lever engaged by the material in continuous formation to be cut, such as a gunpowder cord for instance, and depends consequently on the forces exerted by said material on the shiftable member.

In the case of a pneumatic cutting machine, the location of the movable member may serve in conformity with the invention for the control of a regulator adjusting the output of the fluid controlling the cutting machine.

Further objects and features of the invention will appear in the reading of the following description of embodiments of means embodying the said invention and selected merely by way of exemplification and by no means in a limiting sense. In diagrammatic accompanying drawings—illustrating said embodiment:

Figure 1:
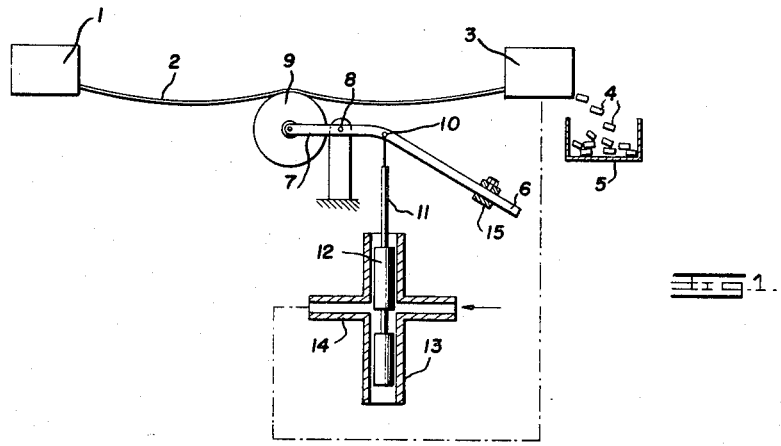
Fig. 1 is a diagram of a control system including a rocking member controlling directly the output of fluid operating a pneumatic cutting machine.

Turning to Fig. 1, 1 designates the draw-plate or extruding machine feeding the gunpowder cord 2 to the cutting machine 3, which cuts said cord into separate sections 4 to be collected inside a vat 5. The arrangement according to the invention is intended, as disclosed, to take into account the modifications in the output of the extruding machine 1 with a view to adjusting the cutting machine in a manner such that the cut sections retain substantially uniform lengths. This arrangement includes a two-arm rocking lever 6—7 pivotally secured to an upright 8. The rocking lever 6—7 is bent as illustrated in Fig. 1 and the arm 6 assumes normally a horizontal position while the arm 7 slopes with reference to horizontality. The outer end of said arm 7 carries a pulley 9 over which passes a cord 2 extending between the two machines 1 and 3. Furthermore, there is pivotally secured at 10 to the arm 6 a link 11 carrying a piston 12 adapted to reciprocate inside the cylinder 13 of the regulating system. The shifting of the piston 12 inside the cylinder 13 has for its result to close to a varying extent the channel 14 feeding compressed air to the pneumatic means controlling the cutting machine 3. The connection of the valve constituted by the cylinder 13 and the piston 12 and the channel 14 passing out of same with the cutting machine has been illustrated diagrammatically by a dot and dash line, since the nature of this connection has no bearing with the actual invention which does not relate to said pneumatic control means. These pneumatic means, which are of any suitable known type, have not been illustrated in the drawing. The arm 6 of the rocking lever carries furthermore an adjustable weight 15.

The arrangement illustrated operates as follows:

When the output of the extruding machine 1 remains constant, the cord 2 progresses at a constant speed and retains the same shape while permanently engaging the pulley 9 so that the piston 12 remains in the same position and the driving means controlling the cutting machine are fed with an unvarying throughput of fluid.

If for any reason whatever, the output of the extruding machine increases, the portion of the cord extending between 1 and 3 becomes longer and the weight acting on the pulley 9 increases. The rocking lever has therefore a tendency to rock and to assume a modified position of equilibrium, as a matter of fact, the lever arm 7 sloping with reference to horizontality, the operative length of said arm increases while the operative length of the arm 6 is substantially constant. This movement of the rocking lever has for its result to raise the piston 12 and to increase consequently the output of compresed air acting on the cutting machine 3. The latter operates at a higher rhythm which corresponds to the increase in the speed of progression of the cord 2 so that consequently the cut sections 4 retain substantially the same length as previously.

In the opposite case where the output of the extruding machine 1 drops, the reverse movement occurs, which leads to a throttling by the piston 12 of the stream of fluid passing through the channel 14, whereby the speed of the cutting machine is reduced.

The adjustable counterweight 15 serves for equilibrating as desired the rocking lever. It may in fact be replaced by a spring. When the system is properly adjusted, the load of cord material bearing on the pulley 9 has thus a tendency to be balanced in a stable manner.

The above-described arrangement is extremely simple but in certain cases, it may not provide the desired sensitivity.

Figure 2:
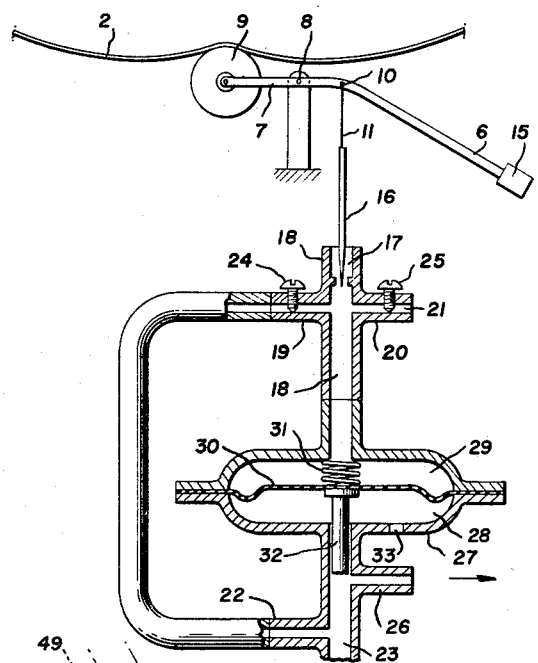
Fig. 2 illustrates a modification thereof provided with a relay in the control system.

The arrangement illustrated in Fig. 2 which includes a relay is more intricate, but it allows obtaining a much larger sensitivity.

As in the preceding case, the cord 2 passes over a pulley 9 carried by the arm 7 of the rocking lever 6—7 pivotally mounted at 8; but the link 11 instead of controlling a slide-valve or a piston 12 as in the case of Fig. 1, carries a conical needle 16 engaging a gauged port 17 formed at the end of a pipe 18, the part played by which will be disclosed hereinafter. Into said pipe 18 open lateral necks 19 and 20. The neck 20 opens to the atmosphere at 21 while the neck 19 communicates through a pipe 22 with the main pipe 23 feeding the operative compressed air. 24 and 25 designate needle valves controlling the output in the necks 19 and 20 respectively. 26 designates a further lateral neck through which the compressed air from the pipe 23 is directed towards the means controlling the cutting machine. The pipes 23 and 18 open respectively into the two compartments 28 and 29 of a chamber 27 which are separated inside the latter by a transverse diaphragm 30. The diaphragm 30 forms a bearing surface for a spring 31 extending inside the compartment 29 and bearing against the opposite wall of the latter. The diaphragm 30 is thus submitted inside the compartment 29 to the pressure prevailing inside the latter; on the other hand a piston 32 fitted slidingly inside the pipe 23 enters the compartment 28 and engages the diaphragm 30 in register with the spring 31 on the opposite side of said diaphragm while the outer end of said piston registers with the opening of the neck 26 into the pipe 23 so as to close the latter to a variable extent according to the position assumed by the diaphragm 30 under the action of the spring 31. 33 designates a leak port in the wall of the chamber 27 opening into the compartment 28 so as to prevent thereby any pressure of air leaking out of the pipe 23 into the compartment 28 from acting on the diaphragm 30.

The above-described arrangement operates as follows:

The chamber 29 is fed with the operative compressed air through the piping 22—19. For a predetermined position given to the needle 16 inside the gauged port 17, the pressure applied through said chamber 29 on the diaphragm 30 depends solely on the cross-section of the necks 19 and 20 of which the adjustment is obtained, as mentioned, through the needle valves 24 and 25. When the needle 16 rigid with the lever arm 6 sinks, the free cross-sectional area of the port 17 is reduced so that the pressure exerted through the chamber 29 on the diaphragm 30 increases and said diaphragm will urge the piston 32 downwardly. Said piston closes then to a corresponding extent the opening in the neck 26 and consequently reduces the output of compressed air fed into the engine and thereby the speed of the latter. This occurs obviously when the load of the cord on the roller 9 decreases.

The reverse procedure is obtained when the load increases, which results in a stabilisation within certain limits of the load carried by the roller 9. This non frictional arrangement is highly sensitive, as experience shows, to all modifications of the weight carried by the roller 9.

Figure 3:
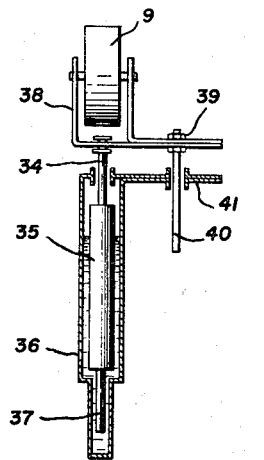
Fig. 3 is a diagrammatic showing of a further embodiment of the movable control member.

In the modification illustrated in Fig. 3, the roller 9 instead of being carried by the arm of a rocking lever is adapted to move vertically and, to this end, it is revolubly carried inside the ams or tines of a fork 38 carried through the agency of a rod 34 by a plunger 35 partly immersed inside and carried by a liquid constituted for instance by mercury and filling a tube 36. The movable system including the plunger and the roller-carrying fork is guided vertically at its upper and lower ends by the rod 34 on one hand and by another rod 37 on the other hand, both rods sliding inside suitable guideways. A small bracket 39 rigid with the fork 38 carries a rod 40 sliding vertically through a port formed in a lug 41 rigid with the tube 36 with a view to preventing the roller from revolving round the axis of its carrier rod 34. This rod 40 which follows the vertical movements of the roller, is adapted to control directly regulating means of the type disclosed with reference to the preceding embodiment. It is readily apparent that the location of the plunger inside the liquid and consequently the location of the roller 9 depend at every moment on the load carried by said roller. The arrangement which has just been described is of particular interest by reason of its small bulk, of its possibility of adjustment by a suitable shaping of the immersed body and of its highly reliable operation.

It is of course possible to bring various modifications to the embodiments disclosed and to the applications thereof to any type of driving units and machines without unduly widening thereby the scope of the invention as claimed in accompanying claims.

Figure 4:
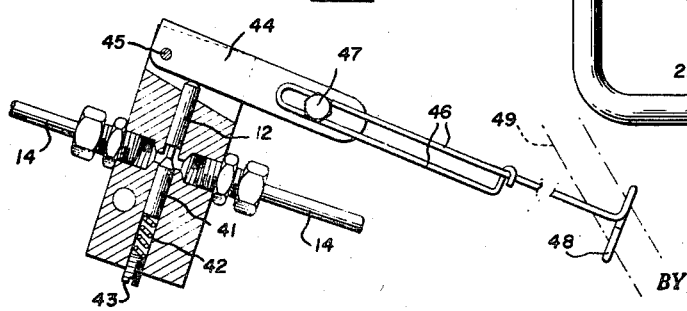
Fig. 4 illustrates a further embodiment.

I have illustrated in Fig. 4 a further embodiment wherein the roller is replaced by a mere stationary member such as an eye through which the strip or cord is caused to pass whereby I obtain a simpler structure while the strip or cord may act on the eye in opposite directions; furthermore said eye or the like movable member is carried preferably at the end of a resilient wire carried in its turn by a lever acting on the means controlling the speed of the cutting or the like treating machine; the point of engagement between said lever and said control means may lie in fact at a very small distance from the pivotal axis of the lever with reference to the total length of the latter so as to provide maximum sensitivity.

Fig. 4 shows by way of example such an embodiment which is again assumed to control a pneumatically controlled machine cutting gunpowder cords, so as to make said machine operate at a speed corresponding to the speed of extrusion of said cords, i.e. to their output. In said Fig. 4, 12 designates again a piston moving inside a cylinder 13 forming a regulating device. The movement of said piston 12 inside the cylinder 13 has as precedingly for its result a closing to a varying extent of the channel 14 adapted to feed compressed air or the like operative fluid into the pneumatic control system of the cutting machine, which system is not illustrated. Said piston 12 is rigid with a further piston 41 housed on the other side of the channel 14 and submitted to the action of a return spring 42 bearing against the plug 43 threadedly engaging the lower end of the cylinder 13 so as to close same, said spring 42 urging thus the piston system 41—12 into engagement with the pivoting lever 44 pivotally secured at 45 to the body of the cylinder. To said lever engaged near its pivot 45 by the piston 12 is secured the member to be engaged by the gunpowder cord 2. Said member is constituted mainly by a piano wire, for instance, one end of which is bent into an eye or hook 49 and which is secured by means of a bolt 47 to the pivoting lever 44. This securing is adjustable as illustrated since the bolt 47 slidingly engages the guideway formed by the elongated loop-shaped end 46 of the piano wire opposed to the eye. The outer end of the wire forming a hook or eye 49 is adapted to be engaged by the cord 50 extending from the extruding machine to the cutting machine. It will be readily ascertained that, according to the length of cord, comprised between the extruding and cutting machines, which length depends on the output of the extruding machine with reference to the throughput of the cutting machine, said cord urges upwardly or downwardly to a variable extent the compound pivoting structure 44—46—49 and acts consequently directly on the piston 12 controlling the throughput of compressed air feeding the cutting machine. Experience has shown that such an arrangement provides in practice excellent results: of course, it may be associated with a relay as in the case of Fig. 2.

Various other embodiments and applications of my invention will appear to anyone skilled in the art within the scope of accompanying claims.

What I claim is:

1. A system controlling the frequency of cutting a continuous strip of material in a fluid-controlled strip-cutting machine in a constant relationship with the rate of progression of said strip through said machine, comprising an eye surrounding and engaging the strip of material at a point where the strip forms a loop, a shiftable member rigidly carrying said eye and the location of which is governed by the sag assumed by the loop engaged by the eye and consequently by the relative speed of the strip, a throttling member controlling the feed of fluid into the cutting machine to change the rate of cutting of the cutting machine in direct response to changes in the sag assumed by the loop and mechanical means operatively connecting said shiftable member with said throttling member.

2. A system for mechanically controlling the rate of cutting of a continuous gun-powder cord by a fluid-operated cutting machine into substantially equal sections of predetermined length, the rate of cutting being directly related to the rate at which said cord is fed from a continuous cord-feeding apparatus into said cutting machine, said cutting machine being spaced from said feeding apparatus, comprising means including a cylinder having a passageway for feeding fluid into said cutting machine to operate said machine, a piston of varying cross-sectional diameter reciprocable within said cylinder and passing thru said passageway to change the cross-sectional area of said passageway and thus control the flow of fluid therethrough to said cutting machine, said piston having first means projecting beyond the outer surface of said cylinder, an elongate member pivotally secured to said cylinder and engaging said first means adjacent one end of said member, an eye rigidly secured to said other end of said elongate member, said eye being located between said cord-feeding apparatus and said cutting machine with the cord passing through and carried and suspended by said eye, the weight of the cord between said apparatus and said machine at any given moment determining the pivotal arc of said eye and elongate member with respect to said cylinder and said first means and, accordingly, determining the position of said piston within said passageway and thus controlling the flow of fluid therethrough to change the rate of cutting of the cutting machine in direct response to the weight of the gun-powder cord.

References Cited in the file of this patent

UNITED STATES PATENTS

| | | |
|---|---|---|
| 1,442,873 | Garey | Jan. 23, 1923 |
| 1,537,531 | Hartman et al. | May 12, 1925 |
| 1,556,728 | Smith | Oct. 13, 1925 |
| 1,608,362 | Bootes | Nov. 23, 1926 |
| 1,787,657 | Andren | Jan. 6, 1931 |
| 1,982,167 | Kauchack | Nov. 27, 1934 |
| 2,143,147 | Ferris | Jan. 10, 1939 |
| 2,316,283 | Piperoux et al. | Apr. 13, 1943 |
| 2,343,466 | Malhiot | Mar. 7, 1944 |
| 2,456,406 | Gordon et al. | Dec. 14, 1948 |
| 2,480,781 | Simpson | Aug. 30, 1949 |
| 2,571,976 | Ward | Oct. 16, 1951 |
| 2,734,335 | Saunders et al. | Feb. 14, 1956 |
| 2,737,089 | Baumgartner | Mar. 6, 1956 |

FOREIGN PATENTS

| | | |
|---|---|---|
| 709,449 | Germany | Aug. 16, 1941 |